United States Patent [19]

Song

[11] Patent Number: 5,564,039
[45] Date of Patent: Oct. 8, 1996

[54] MEMORY ACCESS DELAY CONTROL CIRCUIT FOR IMAGE MOTION COMPENSATION

[75] Inventor: Gi H. Song, Seoul, Rep. of Korea

[73] Assignee: Gold Star Co., Ltd., Seoul, Rep. of Korea

[21] Appl. No.: 366,402

[22] Filed: Dec. 29, 1994

Related U.S. Application Data

[63] Continuation of Ser. No. 69,093, May 28, 1993, abandoned.

[30] Foreign Application Priority Data

May 29, 1992 [KR] Rep. of Korea .................. 92-9270
Dec. 8, 1992 [KR] Rep. of Korea .................. 92-23603

[51] Int. Cl.⁶ ..................................... G06F 13/00
[52] U.S. Cl. ........................... 395/494; 395/550
[58] Field of Search ........................ 395/494, 550

[56] References Cited

U.S. PATENT DOCUMENTS

| | | | |
|---|---|---|---|
| 4,591,909 | 5/1986 | Kuroda et al. | 358/136 |
| 4,958,226 | 9/1990 | Haskell et al. | 358/136 |
| 4,985,767 | 1/1991 | Haghiri et al. | 358/138 |
| 5,157,742 | 10/1992 | Niihara | 358/105 |

Primary Examiner—Krisna Lim
Attorney, Agent, or Firm—Helfgott & Karas, P.C.

[57] ABSTRACT

A memory access delay control circuit for image motion compensation in HDTV, which can adaptively delay read/write time of two frame memories and simply control the delay amount data. The circuit includes a section for providing delay amount data of a write address signal of the frame memories, a delay control section for providing delay control signal for delaying the write address signal as much as the value of the delay amount data, and an address counter section for counting and providing the write address signal in accordance with the delay control signal. According to the present invention, the delay amount data providing section may comprise a section for detecting actual delay amount of the write address signal by utilizing a frame synchronizing signal and a frame synchronizing write signal so as to automatically compensate for the inputted delay amount, thereby providing convenience in use.

7 Claims, 7 Drawing Sheets

MEMORY ACCESS DELAY CONTROL CIRCUIT FOR IMAGE MOTION COMPENSATION

This is a continuation, of application Ser. No. 08/069,093, filed May 28, 1993, now abandoned.

BACKGROUND OF THE INVENTION

1. Field of the Invention

The present invention relates to a memory access delay control circuit for image motion compensation in a high definition television (hereinafter referred to as "HDTV"), and more particularly to a frame memory access delay control circuit which can adaptively delay access time of the memories for reading out and writing image signal data and simply control delay amount for image motion compensation.

2. Description of the Prior Art

Generally, image motion compensation is necessary to realize high picture quality in HDTV. For image motion compensation, two frame memories are used. One of the frame memories is for reading out image data to which a motion vector provided from an encoder is added, and the other frame memory is for writing an added result of the read data and inverse transformed image signal data, thereby performing image motion compensation. The image signal data read/write operation is alternately executed for every image frame and thus image motion compensation per frame can be performed. At this time, a time difference of as much as hundreds of clock pulses (about 140 to 150 clock pulses) should be generated between data read time and data write time and the delay time should be exactly controlled in order to maintain the time difference.

For the control of delay time as stated above, a conventional memory access delay control circuit uses a delay element or a memory for delay. That is, write address is stored in the memory for a required delay time and then is read out, operating the memory first-in first-out (hereinafter referred to as "FIFO"), thereby controlling the delay time.

Figure 1:
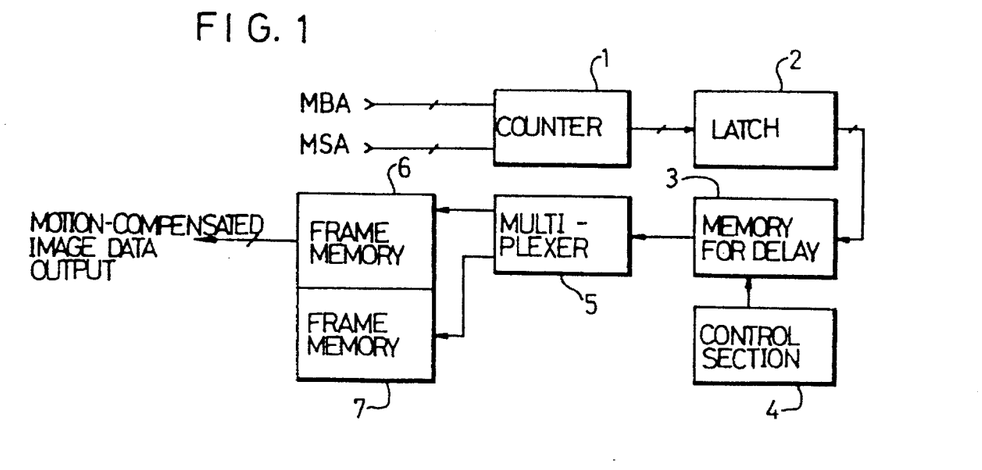
FIG. 1 is a block diagram of a conventional delay control circuit.

As shown in FIG. 1, a conventional memory access delay control circuit comprises a counter 1 for increasing X and Y addresses per block by counting system clock pulses, starting from data with the value of 6-bit inputted macro block address (hereinafter referred to as "MBA") and 7-bit macro slice address (hereinafter referred to as "MSA") in the current processed block, a latch 2 for synchronizing X and Y address values by storing the counted value of counter 1, memory 3 for delaying an output signal of latch 2, being operated in FIFO, control section 4 for controlling the operation of memory 3, switching circuit 5 for switching the output signal of memory 3 per image frame, and two frame memories 6,7 for reading out and writing image data for one frame, of which the address signal is the output signal of switching circuit 5.

Operation of a conventional memory access delay control circuit will be described as follows.

First, counter 1 counts address values per block, starting from the inputted value of MBA and MSA and then outputs the increased X and Y addresses. Latch 2 stores X and Y addresses in order to synchronize the availability of addresses and then provides the synchronized availability of addresses to memory 3. Memory 3 enters the read-enable state or write-enable state under the control of control section 4 and stores the output signals of latch 2 during a specific delay time and then the outputs the signals. Each of output signals of memory 3 is respectively applied to each of frame memories 6,7 by switching circuit 5 as read address and write address, thereby performing image data read/write operation per frame.

However, there has been a problem in that the conventional circuit cannot utilize the existing basic circuits in HDTV but should include separate delay elements or memory for delay. In using memory for delay, high speed operation thereof as well as a separate control section for controlling the read/write operation thereof is always required, so that the manufacturing cost increases. And, when delay elements are used, more than one hundred delay elements for delaying hundreds of clock pulses are required, so that it is impossible to make the circuit practically. Moreover, whenever the delay amount varies, construction of the control section or the number of delay elements should be changed, causing operation of the circuit to be unstable.

SUMMARY OF THE INVENTION

The present invention has been made to overcome the problems involved in the prior art.

It is an object of the present invention to provide a memory access delay control circuit for image motion compensation which can delay the time of writing image data, the delay being predetermined time period or delay amount by delaying a write address signal to be supplied to frame memory without separate delay elements or a memory for delay.

It is another object of the present invention to provide a memory access delay control circuit for image motion compensation which can control the delay amount of the write address signal of frame memory by simply varying the value of delay amount data.

It is still another object of the present invention to provide a memory access delay control circuit for image motion compensation which can detect the actual delay amount of the write address signal of frame memory and automatically compensate inputted delay amount data to match the actual delay amount, thereby preventing the inconvenience of manually varying the value of delay amount data one by one.

In order to achieve the above objects, there is provided a memory access delay control circuit for image motion compensation having two frame memories which comprises means for providing delay amount data of a write address signal of the frame memories.

Delay control means determine the required delay amount from the delay amount data and provide a delay control signal for delaying the write address signal by the determined delay amount. An address counter circuit counts system clock pulses so as to provide the write address signal in correlation with the delay control signal provided from the delay control means.

Latch means synchronize the write address signal provided from the address counter circuit by temporarily storing the write address signal. A switching circuit selectively applies the write address signal, the signal having passed through the latch means, to one of the frame memories in accordance with a frame synchronizing signal so that image data per frame is selectively written in one of the frame memories.

In a preferred embodiment of the present invention, the delay amount data providing means comprises for detecting the actual delay amount of the write address signal of the frame memories in accordance with the frame synchronizing signal and a frame synchronizing write signal.

In a preferred embodiment, the present circuit further comprises means for displaying compensation operation of the delay amount in accordance with the frame synchronizing write signal and the delay control signal from the delay control means.

BRIEF DESCRIPTION OF THE DRAWINGS

The above objects and other advantages of the present invention will become more apparent by describing the preferred embodiments thereof with reference to the accompanying drawings, in which.

DETAILED DESCRIPTION OF THE PREFERRED EMBODIMENTS

Figure 2:
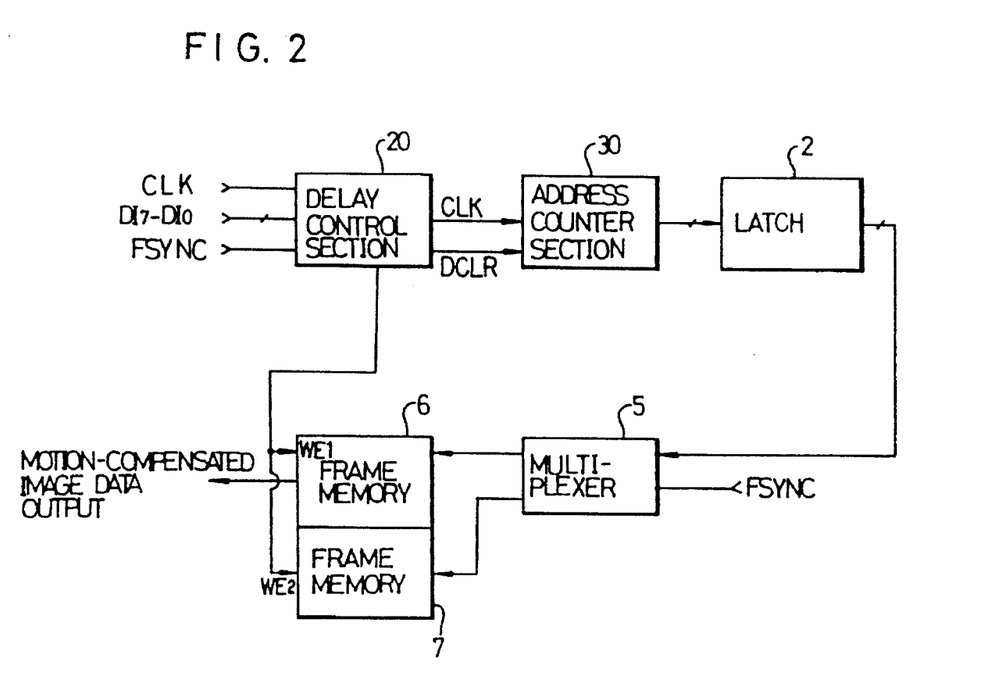
FIG. 2 is a block diagram of one embodiment of the delay control circuit according the present invention.

Referring to FIG. 2, showing the whole construction according to an embodiment of the present invention, delay amount data DI0 to DI7 enters delay control section 20 through 8-bit dual inline package (hereinafter referred to as "DIP") switch (not illustrated) which provides the delay amount data. Delay control section 20 provides each of write enable signals WE1, WE2 to frame memories 6, 7 according to frame synchronizing signal FSYNC, down counts delay amount data DI0 to DI7, and provides delay control signal DCLR when the down-counted value is '0'.

Address counter section 30 provides each of the X and Y write enable address signals by counting the addresses per block according to the delay control signal DCLR and system clock CLK. The X and Y write address signals provided from address counter section 30, are stored at latch 2 in order to be synchronized and then are supplied into switching circuit 5. Switching circuit 5 switches X and Y write address signals provided from latch 2 according to the frame synchronizing signal FSYNC and selectively applies the write address signal to two frame memories 6, 7. Therefore, corresponding image data is respectively written to each of the addresses of frame memories 6, 7.

Figure 4:
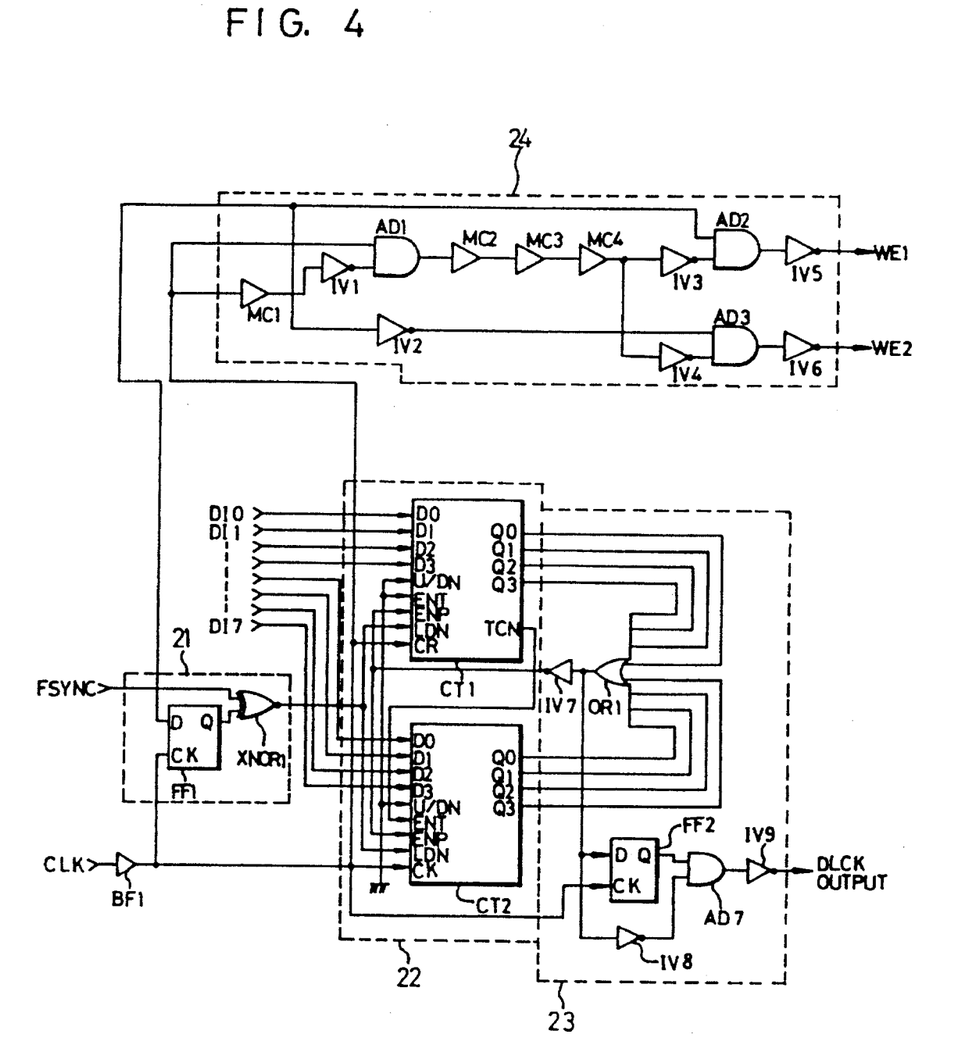
FIG. 4 is an embodied circuit diagram of a delay control section of the present invention.

As shown in FIG. 4, delay control section 20 comprises write enable signal output section 24 for providing write enable signals WE1, WE2 of frame memories 6,7 according to frame synchronizing signal FSYNC, including delay elements MC1 to MC4, inverters IV1 to IV6 and AND gates AD1 to AD3, level change detecting section 21 for determining the start of frame by detecting level change of inputted frame synchronizing signal FSYNC, including flip-flop FF1 and exclusive NOR gate XNOR1, down-counter section 22 for down-counting delay amount data DI0 to DI7 by loading output of the level change detecting section 21, including two down-counters CT1, CT2, and control signal output section 23 for providing delay control signal DCLR according to delay amount data by detecting completion of down-counting of down-counter section 22, including inverters IV7 to IV10, OR gates OR1, OR2 and flip-flop FF2.

Figure 5A:
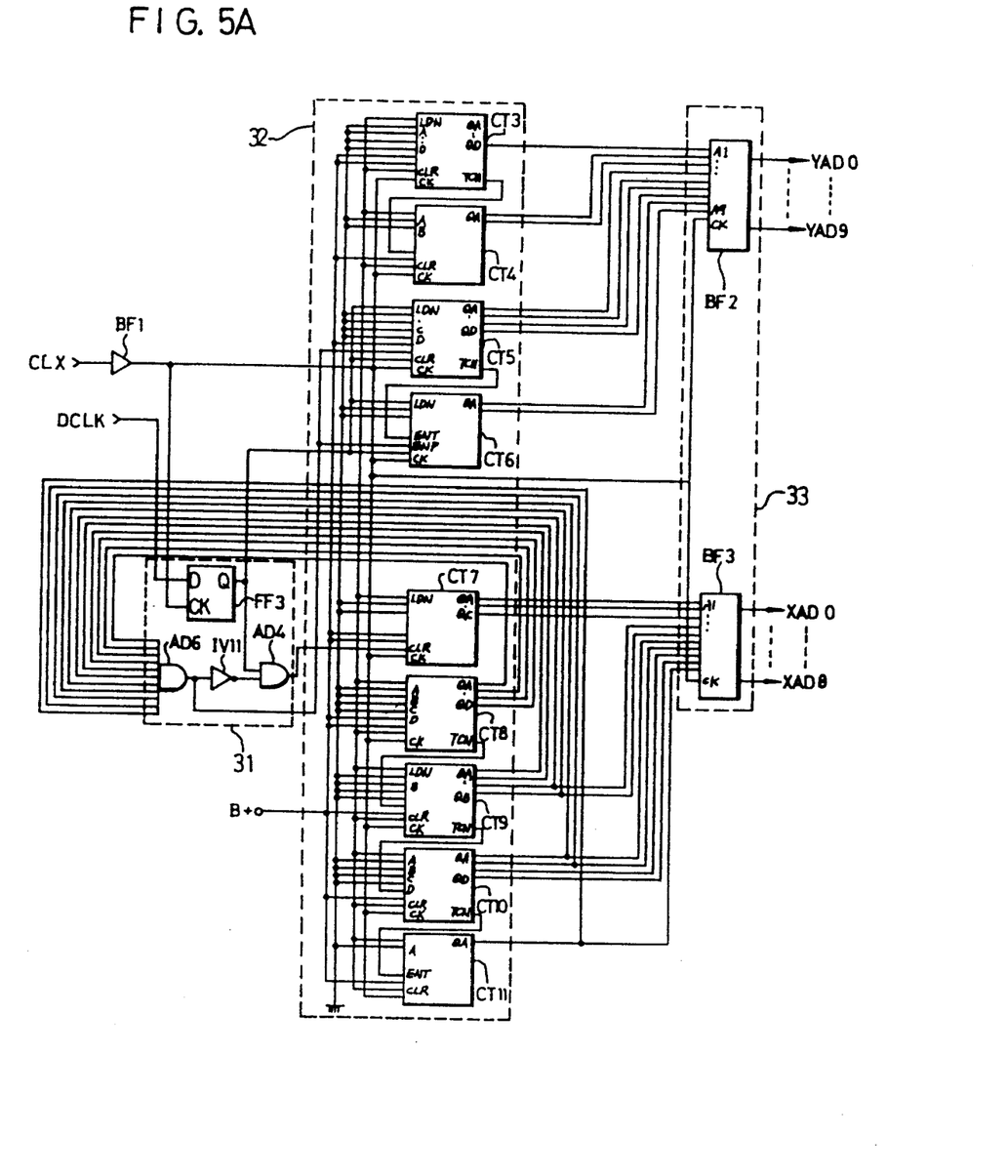
FIG. 5A is a circuit diagram of an embodiment of the address counter section according to the present invention.

As shown in FIG. 5A, address counter section 30 according to an embodiment of the present invention comprises address generating section 32 for generating X and Y address signals XAD0 to XAD8, YAD0 to YAD9 by counting system clock CLK, including counters CT3 to CT6, CT7 to CT11, address output section 33 constructed by buffers BF2, BF3 for outputting address signals provided from address generating section 32, and counter control section 31 comprising AND gate AD6 for determining if the output of address signal for one block is completed from output signal of address output section 33, flip-flop FF3, inverter IV11 and AND gate AD4 for clearing address generating section 32 according to output signal of AND gate AD6 and delay control signal DCLR from delay control section 20.

Figure 5B:
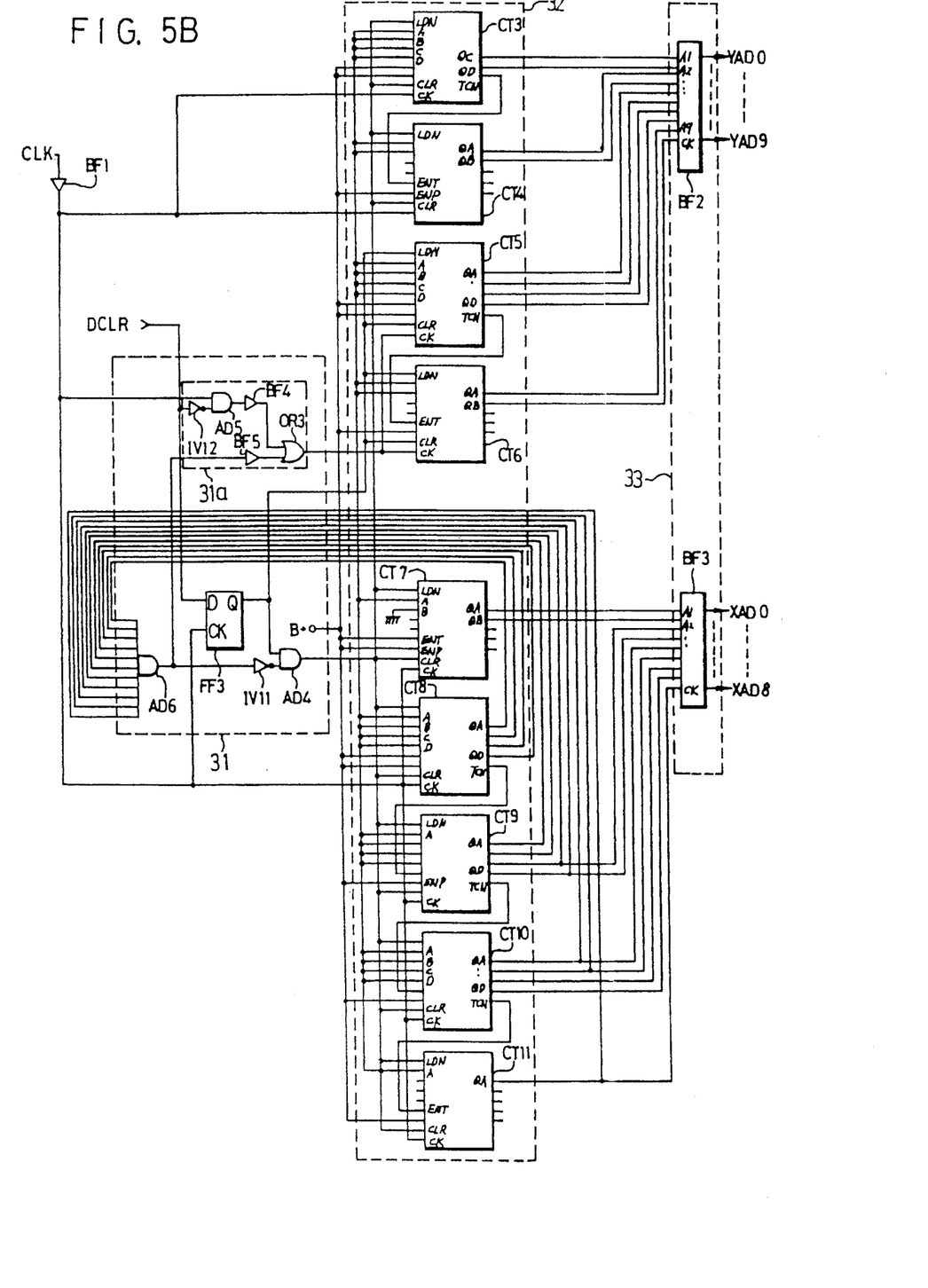
FIG. 5B is a circuit diagram of another embodiment of the address counter section according to the present invention.

Referring to FIG. 5B showing address counter section 30 according to another embodiment of the present invention, counter control section 31 further comprises Y clock signal generating section 31a for generating Y clock signal by combining output signal of AND gate AD6, system clock CLK and delay control signal DCLR.

Figure 3:
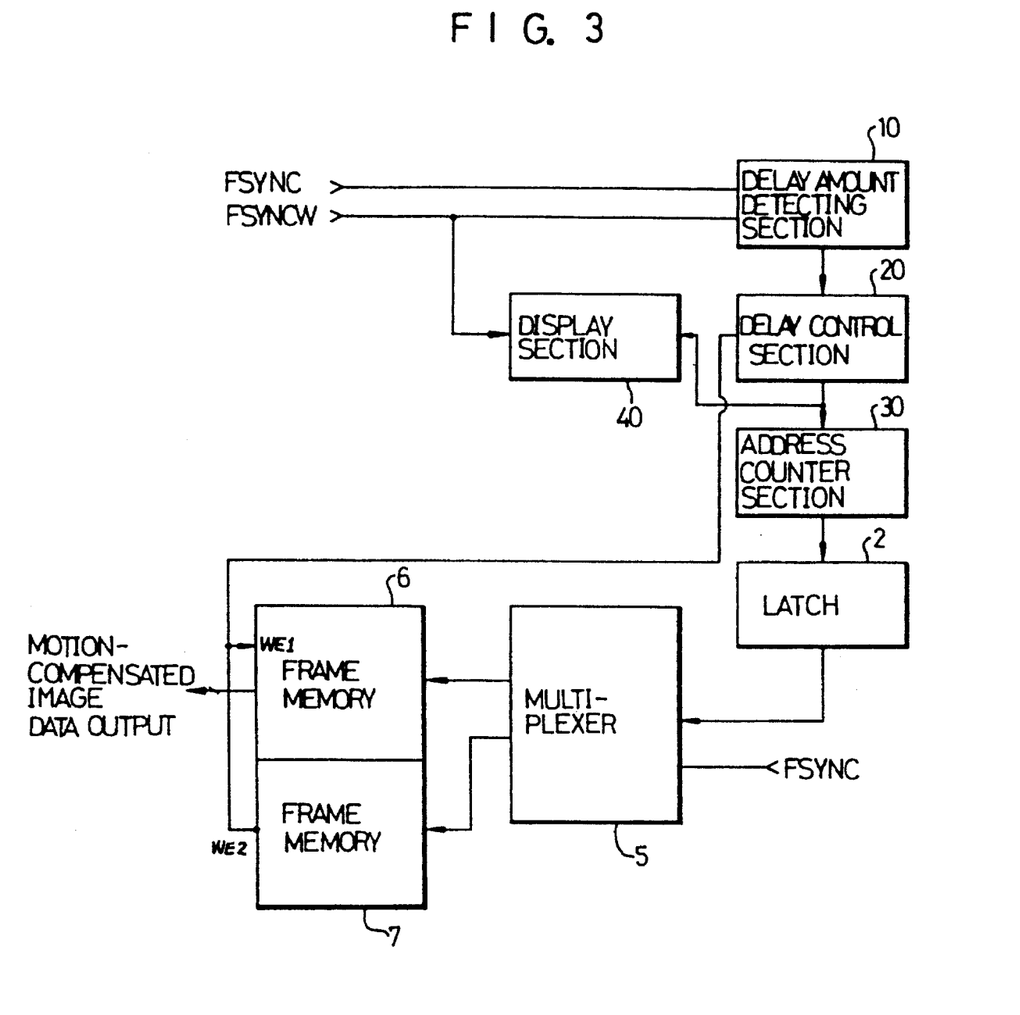
FIG. 3 is a block diagram of another embodiment of the delay control circuit according to the present invention.

Meanwhile, with reference to FIG. 3 showing another embodiment of the present invention, delay amount data providing means comprise delay amount detecting section 10 for providing actual delay amount of write address signal of each frame memories 6,7 to delay control section 20 under the control of frame synchronizing signal FSYNC and frame synchronizing write signal FSYNCW provided from image apparatus itself. In this embodiment, delay-operation displaying section 40 for displaying compensation of delay amount according to frame synchronizing write signal FSYNCW and delay control signal DCLR from delay control section 20 may also be provided.

Frame synchronizing write signal FSYNCW is a signal for synchronizing each write time of frame memories in motion compensation circuit and discrete cosine transform circuit (hereinafter referred to as "DCT"). Delay amount detecting section 10 detects the time difference between frame synchronizing signal FSYNC and frame synchronizing write signal FSYNCW and counts the system clock CLK during the detected time difference and then provides the counted value.

Delay control section 20 determines the delay amount according to an output signal of delay amount detecting section 10 and provides a delay control signal for delaying addresses of frame memories 6,7 according to the determined delay amount.

Delay-operation displaying section 40 displays if the delay amount compensation and synchronization are performed or if the addresses are exactly synchronized.

Figure 6:
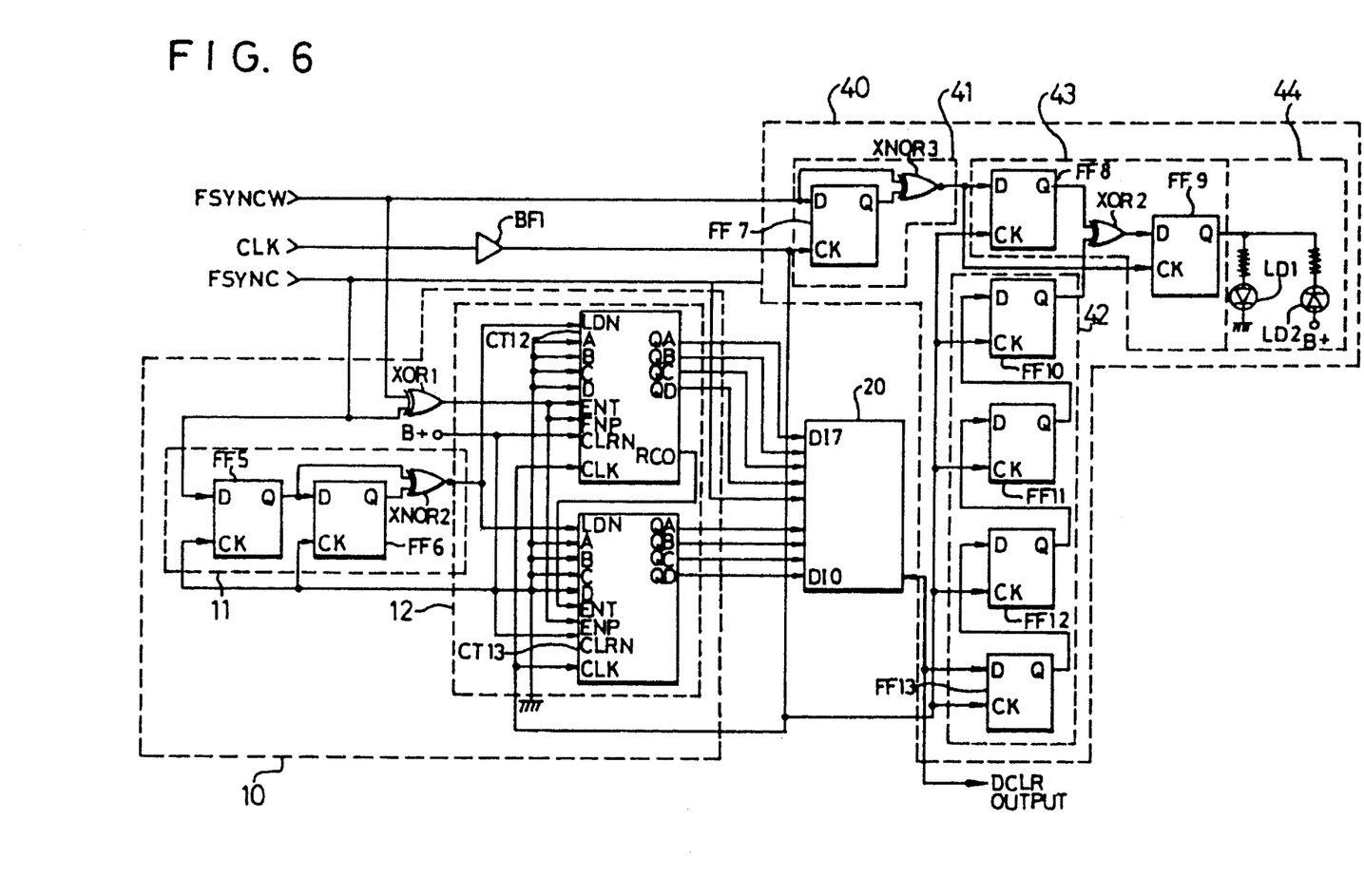
FIG. 6 shows embodied circuit diagrams of the delay amount detecting section and displaying section according to the present invention.

FIG. 6 shows practical circuit diagrams of delay amount detecting section 10 and delay-operation displaying section 40.

Delay amount detecting section 10 comprises exclusive OR gate XOR1 for detecting time difference by XOR-gating frame synchronizing signal FSYNC and frame synchronizing write signal FSYNCW, level change detecting section 11 for detecting level change of frame synchronizing signal FSYNC, including D flip-flops FF5, FF6 and exclusive NOR gate XNOR 2, and delay amount counter section 12 which is controlled to be enabled according to output signal of exclusive OR gate XOR1, to load its input signal according to output signal of level change detecting section 11, and to count system clock CLK in order to output delay amount detecting signal.

And, delay-operation displaying section 40 comprises synchronizing position detecting section 41 for detecting synchronizing position of frame synchronizing write signal FSYNCW, including flip-flop FF7 and exclusive NOR gate XNOR3, control signal counter section 42 for counting output signal of delay control section 20, including flip-flops FF10 to FF13, synchronization comparing section 43 for comparing output signals of synchronizing position detecting section 41 and control signal counter section 42, including flip-flops FF8, FF9 and exclusive OR gate XOR2, and displaying section 44 for displaying state of synchronization according to output signal of synchronization comparing section 43, including light emitting diodes LD1, LD2.

First, the operation according to an embodiment of the present invention will be explained with reference to FIGS. 2, 4, 5B, 7A to 7J.

Figure 7A:
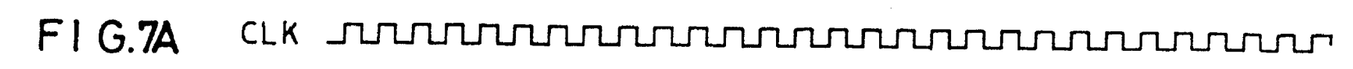
FIG. 7A, 7B, 7C, 7D, 7E, 7F, 7G, 7H, 7I, and 7J are signal waveform diagrams at each part in FIG. 4.

If the B+ power supply is applied to delay control section 20 of FIG. 4, system clock CLK of 15 MHz as shown in FIG. 7A passes through buffer BF1 and is directly applied to one input terminal of AND gate AD1 in enable signal output section 24 and, at the same time, is delayed by delay element MC1, inverted by inverter IV1 and then is applied to the other input terminal of AND gate AD1. According to the inputted system clock CLK, AND gate AD1 generates a pulse signal. The pulse signal is sequentially delayed through delay elements MC2 to MC4 and is inverted by inverters IV4, IV3, respectively, and then is applied to each input terminal of AND gates AD2, AD3.

Figure 7B:
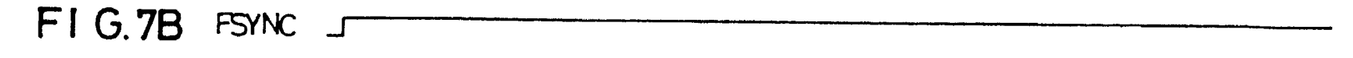
Figure 7C:
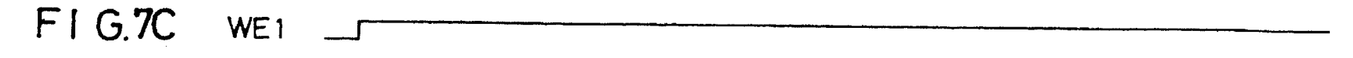
Figure 7D:
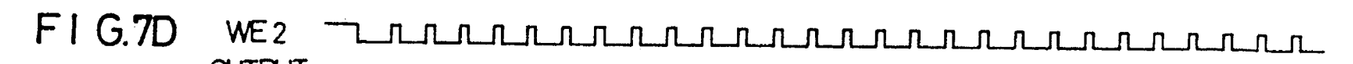

At this state, a frame synchronizing signal of high level shown in FIG. 7B is directly applied to the other input terminal of AND gate AD2, and is simultaneously inverted by inverter IV2 and then is applied to the other input terminal of AND gate AD3. Accordingly, each of AND gates AD2, AD3 respectively provides pulse signals, which are respectively inverted into the signal shown in FIG. 7C, 7D by inverters IV5, IV6 and then are respectively applied to each of frame memories 6, 7 as write enable signals WE1, WE2. And, the frame synchronizing signal FSYNC is applied to one input terminal of exclusive NOR gate XNOR1 in the level change detecting section 21. At this time, flip-flop FF1 receives the frame synchronizing signal FSYNC and outputs a low level signal shown in FIG. 7E from output terminal Q thereof and then applies the low level signal to the other input terminal of exclusive NOR gate XNOR1. Accordingly, exclusive NOR gate XNOR1 outputs a low level signal shown in FIG. 7F and then applies it to each load terminal LDN of counters CT1, CT2 in down-counter section 22. Then, counters CT1, CT2 respectively load delay amount data, DI0 to DI3, and DI4 to DI7 which has been applied to input terminals D0 to D3 thereof.

Figure 7E:
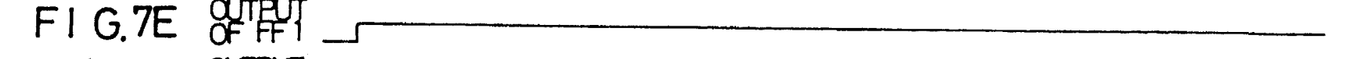
Figures 7F, 7G, 7H:
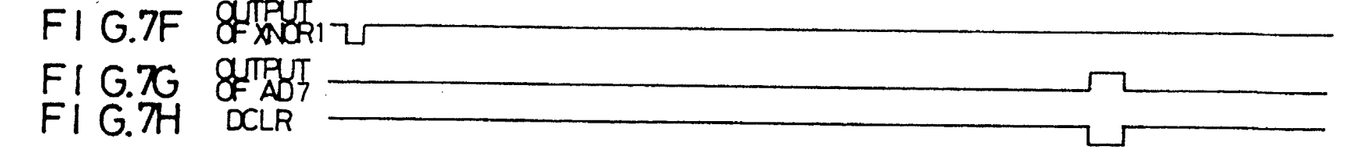

At this point, since system clock CLK having passed through buffer BF1 is inputted, flip-flop FF1 outputs a high level signal shown in FIG. 7E from its output terminal Q and exclusive NOR gate XNOR1 outputs a high level signal shown in FIG. 7F. Therefore, the load-operation by counters CT1, CT2 is stopped.

After delay amount data DI0 to DI7 are loaded to counters CT1, CT2 as stated above, counter CT1 starts down-counting according to the inputted system clock CLK. Whenever counter CT1 completes down-counting, it outputs a low level signal from its carry terminal TCN so that it operates counter CT2 to down-count.

In this state, if counters CT1, CT2 complete down-counting and respectively output low level signal from their output terminals Q0 to Q3, OR gate OR1 in control signal output section 23 outputs a low level signal and then inverter IV7 inverts it into high level signal. This high level signal is applied to each enable terminal ENP of counters CT1, CT2 so as to stop the operation thereof.

And, the low level signal provided from OR gate OR1 is inverted into high level signal by inventer IV8 and then is applied to one input terminal of AND gate AD7. At this time, flip-flop FF2 provides a high level signal from its output terminal Q and then applies it to the other input terminal of AND gate AD7, due to a high level signal provided from OR gate OR1 before each of counters CT1, CT2 completes down-counting. Therefore, AND gate AD7 provides a high level signal shown in FIG. 7G.

When each of counters CT1, CT2 completes down-counting, OR gate OR1 provides a low level signal and then flip-flop FF2 provides a low level signal from output terminal Q thereof according to the system clock CLK. Thus, a high level signal is generated from AND gate AD7 and is inverted by inverter IV 9 as shown in FIG. 7H and then is outputted as delay control signal DCLR.

Delay control signal DCLR provided from delay control section 20 as stated above is applied to the input terminal of flip-flop FF3 in counter control section 31 of FIG. 5B. Flip-flop FF3 provides a low level signal according to the system clock CLK and clears counters CT5, CT6 in the address generating section 32 and then applies the low level signal to AND gate AD4. Accordingly, AND gate AD4 outputs a low level signal and clears the other counters CT3, CT4, CT7 to CT11.

And, delay control signal DCLR from delay control section 20 is inverted into high level signal by inverter 12 in the Y clock signal generating section 31a and then is applied to AND gate AD5. AND gate AD5 provides a pulse signal according to the system clock CLK. The pulse signal passes through buffer BF4, OR gate OR3 and is then applied to each clock terminal CK of counters CT5, CT6 as Y clock signal YCLK to be counted.

Moreover, a high level signal provided from AND gate AD6 according to output signals of counters CT8 to CT11 passes through buffer BF5 and is applied to OR gate OR3 and then controls Y clock signal YCLK. Moreover, the high level signal is inverted into a low level signal by inverter IV11 and then is applied into AND gate AD4. Therefore, AND gate AD4 provides a low level signal so that it controls the function of clearing counters CT3, CT4, CT7 to CT11.

Figure 7I:
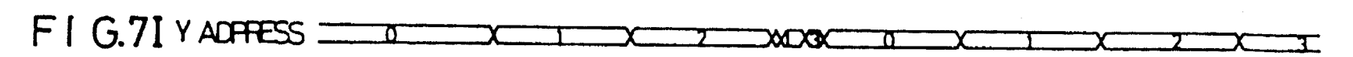
Figure 7J:
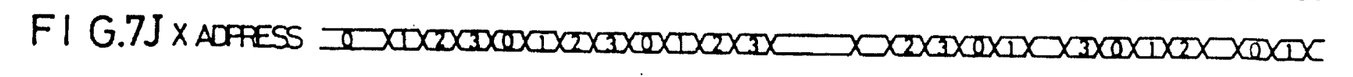

Counters CT3 and CT4, CT5 and CT6 generate Y address signals YAD0 to YAD9 shown in FIG. 7I by respectively counting system clock CLK and Y clock signal and provides them to buffer BF2 in address output section 33. And, counters CT7 to CT11 provide X address signals XAD0 to XAD8 shown in FIG. 7J to buffer BF3 by counting clock signal CLK.

X address signals XAD0 to XAD8 and Y address signals YAD0 to YAD9 provided from address output section 33 are temporarily stored at latch 2 in order to be synchronized and then are applied to switching circuit 5 being controlled by frame synchronizing signal FSYNC to be selectively applied to each of frame memories 6, 7 as write enable signal. Therefore, image data can be adaptively delayed and then be written to each of frame memories.

Meanwhile, operation according to another embodiment of the present invention will be explained referring to FIGS. 3,4,5A and 6.

If system clock CLK, frame synchronizing signal FSYNC and frame synchronizing write signal FSYNCW enter delay amount detecting section 10, respectively, an exclusive OR gate detects the time difference between the synchronizing signals FSYNC, FSYNCW by XOR-gating them.

Flip-flops FF5, FF6 in level change detecting section 11 delay inputted frame synchronizing signal FSYNC and exclusive NOR gate XNOR2 XNOR-gates output signals of flip-flops FF5, FF6 so that the level change of frame synchronizing signal FSYNC can be detected. In accordance with output signals of exclusive OR gate XOR1 and level change detecting section 11, counters CT12, CT13 in the delay amount counter section 2, count delay amount.

That is, counter CT12, CT13 enter enable state by a high level signal provided from exclusive OR gate XOR1, and, according to output signal of level change detecting section 11, counters CT12, CT13 load low level signals having been applied to input terminals A,B,C,D therein and then count system clock CLK. If exclusive OR gate XOR1 provides a low level signal, counter CT12, CT13 are disabled and then output the counted value up to the present as delay amount. Delay amount is continuously provided until level change detecting section 11 outputs a low level signal.

And, level change detecting section 21 in delay control section 20 detects level change of frame synchronizing signal. According to the detected signal, down-counters CT1, CT2 in down-counter section 22 down-count delay amount by loading delay amount provided from delay amount detecting section 10. In accordance with down-counted value of down-count section 22, control signal output section 23 provides a delay control signal for controlling generation of address of as much as delay amount.

That is, each of synchronizing signals FSYNC, FSYNCW is periodically inverted into high or low level signal and delay amount is detected in the first period. From the second period, delay control signal is generated according to the detected delay amount as well as the change of delay amount is detected, if any.

As stated above, if delay control section 20 provides delay control signal DCLR corresponding to delay amount, control signal counter section 42 in delay operation displaying section 40 counts delay control signal DCLR and synchronizing position detecting section 41 detects synchronizing position of frame synchronizing write signal FSYNCW. Synchronization comparing section 43 compares output signals of synchronizing position detecting section 41 and control signal counter section 42. According to output signal of synchronization comparing section 43, each of light emitting diodes LD1, LD2 in dislaying section 44 is selectively turned on so as to display the state of synchronization.

That is, if output signals are not synchronized, synchronization comparing section 43 provides a high level signal so that light emitting diode LD1 is turned on. And, if output signals are synchronized by compensating for delay amount, synchronization comparing section 43 provides a low level signal so that light emitting diode LD2 is turned on.

Delay control signal DCLR provided from delay control section 20 enters flip-flop FF3 of counter control section 31 in address counter section 30 of FIG. 5A. Flip-flop FF3 provides a low level signal according to system clock CLK so that counters CT5, CT6 in address generating section 32 are cleared. Also, AND gate AD4 provides a low level signal due to output signal of flip-flop FF3 so that counters CT3, CT4, CT7 to CT11 are cleared. A high level signal provided from AND gate AD6 according to output signal of counters CT7 to CT11 is inverted into low level signal through inverter IV11 and then is applied to AND gate AD4. Accordingly, AND gate AD4 provides a low level signal, thereby clearing counters CT3, CT4, CT7 to CT11.

In accordance with output signal of counter control section 31, counters CT3 to CT11 in address generating section 32 are cleared and count system clock CLK so as to generate X and Y address signals XAD0 to XAD8, YAD0 to YAD9. The generated X and Y address signals XAD0 to XAD8, YAD0 to YAD9 pass through each of buffers BF2, BF3 in address output section 33 and then are provided to latch 2. Therefore, image data can be adaptively delayed in order to be written to each of frame memories 6, 7 as stated above.

From the foregoing, it will be apparent that the present invention can exactly delay as much as required delay amount of write address signal of frame memory and simply control the delay amount by varying the value of delay amount data without separate delay elements or memory for delay. Further, if actual delay amount is changed by some factor, the present invention immediately detects such change and automatically compensates for input delay amount so as to be actual delay amount and displays the delay amount compensation state, thereby providing convenience in use. Furthermore, since the control of delay amount is performed, being synchronized by the system clock, stability of circuit operation can be improved.

While the present invention has been described and illustrated herein with reference to the preferred embodiments thereof, it will be understood by those skilled in the art that various changes and revisions in form and details may be made therein without departing from the spirit and scope of the invention.

What is claimed is:

1. A memory access delay control circuit for image motion compensation having two frame memories, comprising:

means for providing delay amount data for a write address signal of said frame memories;

delay control means for determining a delay amount from said delay amount data and providing a delay control signal for delaying said write address signal as much as said determined delay amount;

address counter means being input said delay control signal, said address counter means counting pulses of a system clock so as to provide said write address signal in correspondence with said delay control signal;

latch means for temporarily storing said write address signal provided from said address counter means; and a switching circuit for selectively applying said write address signal, having passed through said latch means, to one of said frame memories in correspondence with a frame synchronizing signal so that image data per frame is selectively written in one of said frame memories, said means for providing delay amount data including means for detecting an actual delay amount of said write address signal in correspondence with said system frame synchronizing signal and a frame synchronizing write signal.

2. A memory access delay control circuit as claimed in claim 1, wherein said delay amount detecting means comprises:

an exclusive OR gate for XOR-gating said frame synchronizing signal and said frame synchronizing write signal so as to detect time difference therebetween;

means for detecting a level change of said frame synchronizing signal; and a delay amount counter means for counting said system clock pulses so as to provide a delay amount detecting signal, said delay amount counter means being loaded in accordance with an output signal of said level change detecting means and being enabled in accordance with an output signal of said exclusive OR gate.

3. A memory access delay control circuit as claimed in claim 1, further comprising means for displaying adjustment of said delay amount in accordance with said frame synchronizing write signal and said delay control signal.

4. A memory access delay control circuit as claimed in claim 3, wherein said displaying means comprises:

means for detecting a synchronizing position of said frame synchronizing write signal;

means for counting said delay control signal;

means for comparing output signals of said synchronizing position detecting means and said delay control signal counting means; and a display for optically displaying a synchronization state in accordance with an output signal of said comparing means.

5. A memory access delay control circuit as claimed in claim 1, wherein said delay control means comprises:

means for detecting a level change of said frame synchronizing signal;

means for down-counting said delay amount data, said down-counting means being loaded in accordance with an output signal of said level change detecting means; and means for providing said delay control signal when said down-counting means completes its down-counting.

6. A memory access delay control circuit as claimed in claim 5, wherein said delay control means further comprises means for generating and providing write enable signals of said frame memories in accordance with said frame synchronizing signal.

7. A memory access delay control circuit as claimed in claim 1, wherein said address counter means comprises:

means for generating an address signal by counting said system clock pulses;

means for providing said generated address signal to said latch means; and a counter control means for determining if output of said address signal for one block is completed from an output signal of said address signal providing means and clearing said address signal generating means in accordance with a signal determined by said counter control means and said delay control signal.

* * * * *